US00RE33869E

United States Patent [19]

Stahlecker et al.

[11] E Patent Number: Re. 33,869

[45] Reissued Date of Patent: Apr. 7, 1992

[54] APPARATUS FOR PRODUCING A STAPLE FIBER YARN

[76] Inventors: Fritz Stahlecker, Josef-Neidhart-Strasse 18, 7347 Bad Überkingen; Hans Stahlecker, Haldenstrasse 20, 7344 Süssen, both of Fed. Rep. of Germany

[21] Appl. No.: 495,995

[22] Filed: Mar. 20, 1990

Related U.S. Patent Documents

Reissue of:

[64] Patent No.: 4,785,619
Issued: Nov. 22, 1988
Appl. No.: 155,284
Filed: Feb. 12, 1988

[30] Foreign Application Priority Data

Feb. 12, 1987 [DE] Fed. Rep. of Germany ..... 3704344
Apr. 29, 1987 [DE] Fed. Rep. of Germany ..... 3714214

[51] Int. Cl.[5] ..... D01H 9/18; D01H 1/00; D01H 5/28; D02G 3/22

[52] U.S. Cl. ..... 57/313; 57/281; 57/328

[58] Field of Search ..... 57/328, 313, 281; 242/35.5 H

[56] References Cited

U.S. PATENT DOCUMENTS

| | | | |
|---|---|---|---|
| 2,902,820 | 9/1959 | Bronson et al. | 57/313 X |
| 3,154,904 | 11/1964 | Fürst | 57/281 X |
| 3,257,793 | 6/1966 | Abbott | 57/313 X |
| 3,903,681 | 9/1975 | Bous | 57/313 |
| 4,137,698 | 2/1979 | Tillman | 57/313 X |
| 4,164,840 | 8/1979 | Chilpan et al. | 57/313 |
| 4,484,436 | 11/1984 | Nakayama et al. | 57/328 |
| 4,572,447 | 2/1986 | Raasch | 242/35.5 A |
| 4,657,194 | 4/1987 | Wey et al. | 242/35.5 A |
| 4,702,427 | 10/1987 | Raasch | 242/35.5 A |
| 4,838,019 | 6/1989 | Ueda | 57/281 |

FOREIGN PATENT DOCUMENTS

| | | | |
|---|---|---|---|
| 0038143 | 10/1981 | European Pat. Off. . | |
| 60-15729 | 4/1985 | Japan | 57/328 |

*Primary Examiner*—Joseph J. Hail, III
*Attorney, Agent, or Firm*—Evenson, Wands, Edwards, Lenahan & McKeown

[57] ABSTRACT

In the case of an arrangement for producing staple fiber yarn that is first prespun on an air spinning machine and that subsequently is finish-spun on a simplified ring spinning machine, it is provided that the air spinning machine and the ring spinning machine, by means of a conveying device for the spools receiving the prespun yarn, are connected to form a machine system, the ring spinning machine of which and the air spinning machine of which each have a number of spinning points that are coordinated with one another.

61 Claims, 3 Drawing Sheets

APPARATUS FOR PRODUCING A STAPLE FIBER YARN

Matter enclosed in heavy brackets [ ] appears in the original patent but forms no part of this reissue specification; matter printed in italics indicates the additions made by reissue.

BACKGROUND AND SUMMARY OF THE INVENTION

The invention relates to a compound machine for producing a staple fiber yarn, including an air spinning machine for prespinning the yarn. The spinning points of this air spinning machine each contain a drafting frame, a pneumatic false-twisting nozzle, a withdrawal device and a wind-up device for winding up a spool with prespun yarn. The yarn is subsequently finish-spun on further devices of the combination machine, the spinning points of which further devices each contain at least one spool receiving device and a ring spindle.

It is known from Japanese Patent (JP-PS) No. 60-15 729B to pneumatically prespin a yarn by means of an air spinning machine to which the fiber material is fed in roving bobbins and then to wind the yarn onto spools that are subsequently fed to a simplified ring spinning machine and are finish-spun there. The ring spinning machine is simplified to such an extent that, instead of drafting frames for the spinning points, in each case, only spool receiving devices are provided. It is possible, by means of this type of yarn production, to increase production speed since, on the one hand, in the area of the air spinning machine, work can take place at very high speeds. On the other hand, it is possible, by means of the ring spinning machine, to also operate at significantly higher speeds since the $\alpha$-value or so-called twist coefficient, in comparison to ring yarn spun in the conventional way, can be reduced by 30% to 50%.

In the case of a known arrangement of European Patent Application (EP-A) No. 38 143, on a first machine, two drawn and prestrengthened slivers are wound onto a feed spool as a double yarn. Neither the prestrengthened slivers, nor the double yarn can be used as a yarn in this form because their strength is insufficient. The individual yarn components, particularly by means of pneumatic false-twisting, are prestrengthened only to such an extent that they withstand the strains occurring during the winding-up of the double yarn on the feed spool. In this case, individual marginal fibers are wound around the essentially untwisted yarn core. The actual strength of the yarn structure is generated only in a subsequent twisting process that takes place on a machine used for twisting to which the feed spools with the double yarn are fed. The efficiency of this process is mainly based on the fact that the two prestrengthened yarn components do not receive a permanent spinning twist, so that consequently this spinning twist does not have to be undone in the subsequent twisting process. As a result, the production performances can be increased of the machine for the generating of the feed spool as well as of the machine used for twisting. If the whole operational sequence were carried out in one machine, i.e., if the two prestrengthened yarn components, instead of being wound onto a feed spool, were fed to a twisting device, the efficiency would be impaired because the speeds of the two operating steps are not in harmony with one another.

An objective of the invention is to provide an arrangement of the initially mentioned type that utilizes the advantages of both types of machines in a way that is as economical as possible.

This objective is achieved by connecting an air spinning machine and ring spinning machine, by means of a conveying device for the spools receiving the prespun yarn, to form a combination machine system or compound machine, the ring spinning machine portion and the air spinning machine portion of this machine system each having a mutually coordinated number of spinning points.

A machine system or compound machine of this type permits an economical method of operation because the spinning points of the faster air spinning machine portion, with respect to their number, are coordinated with the slower spinning points of the simplified ring spinning machine portion. However, each of the two machine portions can be utilized fully and therefore operate economically.

A machine system or compound machine of this type may be generally compared approximately with the combination of a flyer and a ring spinning machine that is customary in the base of the classical ring spinning method, according to certain aspects of the inventive compound machine. In this case, the air spinning machine portion takes over a function like the flyer, already at this point containing the drafting frames of the classical ring spinning machine. The air spinning machine portion can operate at very high speeds, one spinning point taking over the drafting frame work of about 20 spinning points of the current ring spinning machine. By means of the reduction of the number of drafting frames, the servicing and the cleaning of high-performance drafting frames of this type can be simplified, because the surfaces to be cleaned are reduced considerably. The manufacturing of the simplified ring spinning machine, because of the absence of the drafting frame, is about 35% less expensive than that of a classical ring spinning machine. In addition, as a result of the increase of the operating speeds, the number of the required spinning points is clearly reduced, resulting in a further reduction of cost.

Furthermore, the simplified ring spinning machine portion of the present invention leads to higher efficiency because the number of yarn breakages is reduced. Since the prespun yarn has an increased strength compared to a normal sliver, yarn breakages are relatively infrequent in the simplified ring spinning machine. Also in the air spinning machine portion, the danger of yarn breakages is relatively low because no balloon of yarn is required in its area, the effect of which goes back to the delivery cylinders of the drafting frame. In addition, the servicing can be simplified because one operator, who is still required even for an automatic operation, can take care jointly of both connected machine portions, having to cover only very short distances. In addition because of the high performance of the inventive compound machine, relatively short overall machines are obtained so that the space requirement is reduced fort given volume of yarn production.

The economic advantage in comparison to the combination of a flyer and a ring spinning machine can also be clearly demonstrated by means of a numerical example. If a yarn of a count of Nm50 is to be spun at 1,000 spinning points of a conventional ring spinning machine, about 30 operating points of a flyer are assigned to them. In the case of the same production and the same yarn count, the machine system or compound machine of the invention requires only 73 spinning points for the air spinning machine portion and about 700 spinning points for the simplified ring spinning machine portion. The resulting advantage becomes even clearer if finer yarn counts are to be spun. In the case of the machine system according to the invention, the air consumption becomes continuously less in the case of finer yarn counts, while, nevertheless, also in the case of fine yarn counts, the work in the area of the air spinning machine can take place at very high delivery speeds, because no balloon of yarn exists there that strains the yarn.

In especially preferred embodiment of the invention, the designing of the compound machine system for the practical operation takes place in such a way that the number of spinning points of the air spinning machine portion and of the ring spinning machine portion is determined for the finest yarn count that is contemplated to be processed in this special operation. When coarser yarn counts are spun, if necessary, spinning points of the simplified ring spinning machine portion will then not be used. If two prestrengthened yarn components at each spinning point are fed to the machine portion for the finish-spinning, which, as a rule, is a simplified ring spinning machine, a twisted-yarn-type staple fiber yarn is produced. In this case, it is contemplated in certain preferred embodiments to feed the yarn component of two spools, or to carry out the feeding from only one feeding spool on which two yarns are wound as a double yarn. In this case, the machine portion for the finish-spinning may be a double-twist frame.

Other objects advantages and novel features of the present invention will become apparent from the following detailed description of the invention when considered in conjunction with the accompanying drawings.

DETAILED DESCRIPTION OF THE DRAWINGS

Figure 1:
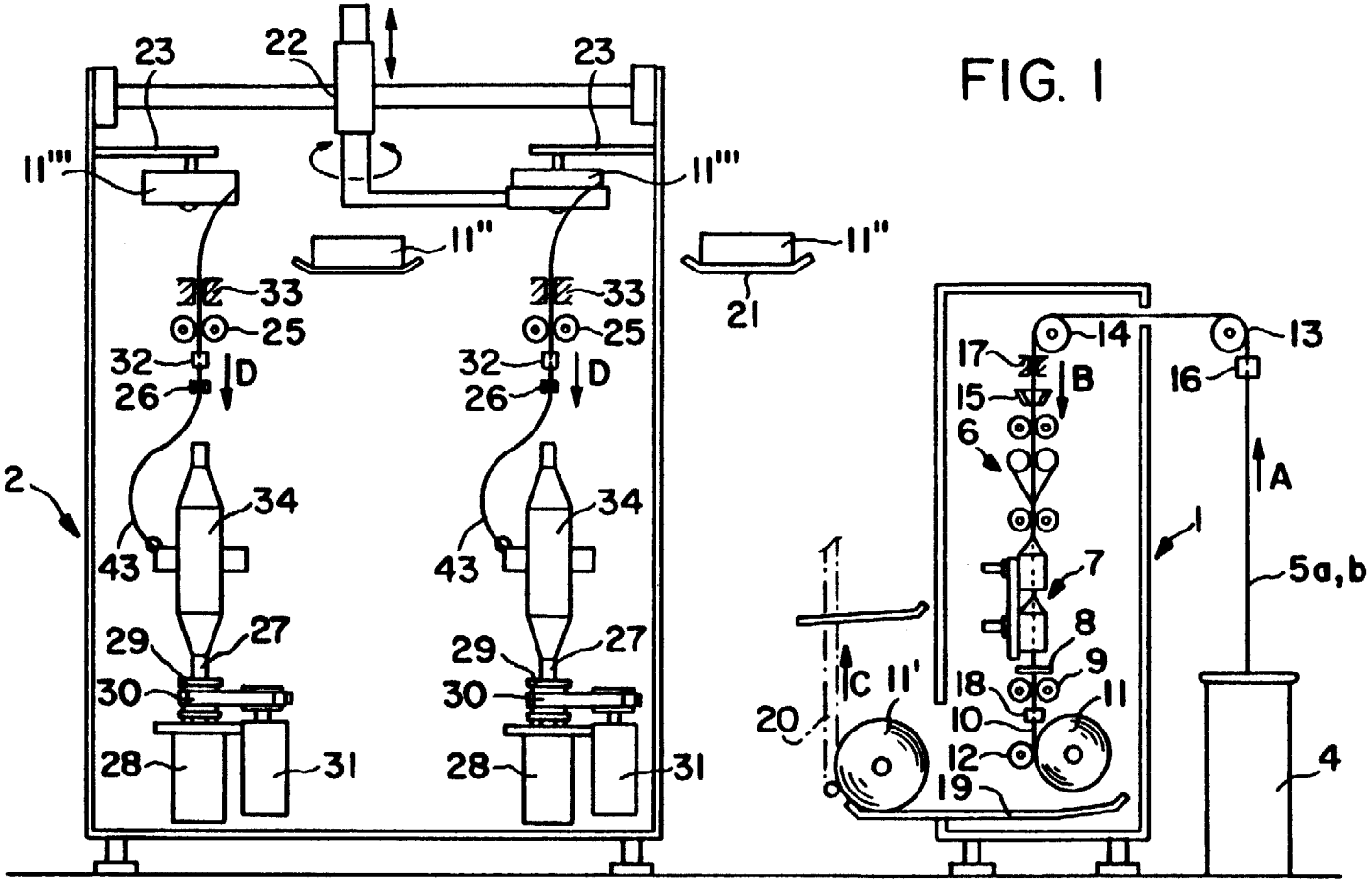
FIG. 1 schematically shows a compound machine system comprising a first machine portion for producing a feed spool and a second machine portion for carrying out a twisting operation, constructed in accordance with a preferred embodiment of the invention; [and]
Figure 2:
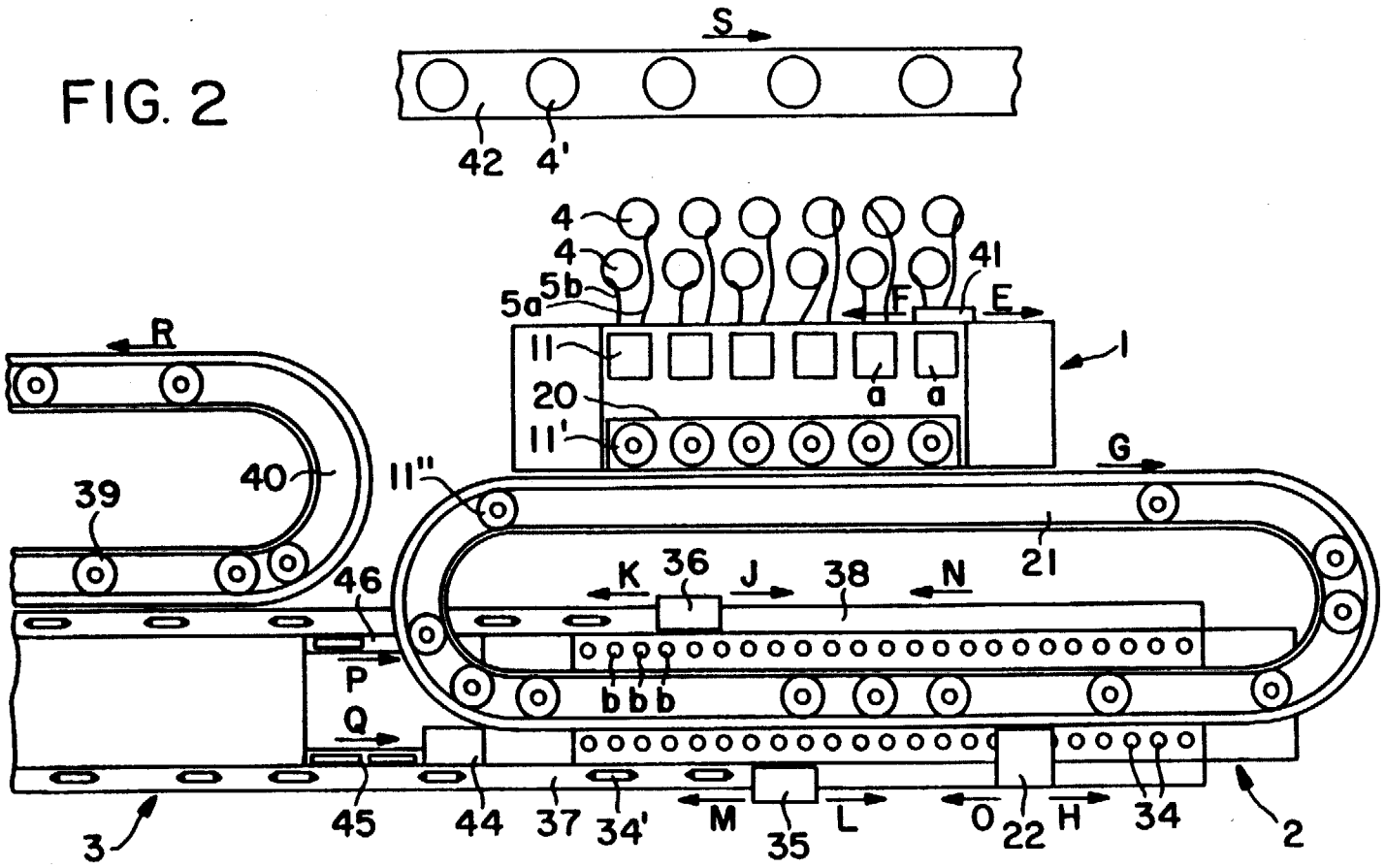
FIG. 2 is top view of a compound machine system constructed with the machine portions of FIG. 1.

The machine system shown in FIGS. 1 and 2 comprises three machine portions or segments 1, 2, 3 that together form a production unit compound staple yarn forming machine. FIG. 1 shows details of only two of these machine segments 1, 2. One of these machine segments is a machine 1 for producing feed spools 11, 11', 11" of prestrengthened yarn that are subsequently twisted in machine 2. The twisting spools 34, 34' are subsequently fed to a machine 3 (FIG. 2) for rewinding that produces the cross-wound spools 39 with a cleaned twisted yarn.

The first machine 1, that consists of several operating points (a), at each operating point (a), processes slivers 5a, 5b that are withdrawn from spinning cans 4. In the case of a modified embodiment, the slivers 5a, 5b may also be fed as sliver laps. The slivers 5a, 5b are drawn to the desired yarn count at the operating points (a), by means of high-draft drafting frames 6. The delivery speed of the drafting frame amounts to over 200 m/min.

To the high-draft drafting frames 6, twisting zones 7 are connected in which the drawn slivers 5a, 5b are prestrengthened by pneumatic false-twisting by means of air nozzles. In this manner, fiber ends are wound around the core of the individual slivers that remains essentially untwisted. The prestrengthening takes place only to such an extent that the slivers 5a, 5b withstand the further processing, but would not be usable as single yarns or as double yarns. Under certain circumstances, a filament yarn may be added as a reinforcing yarn.

Behind the twisting zone 7, the two slivers 5a, 5b are guided together by means of a guiding device 8 and are fed to a pair 9 of withdrawal rollers. Subsequently, the two, now prestrengthened yarn components are wound, in a multiple-wound form, as a double yarn 10 onto a spool 11 that is driven by a winding roller 12.

The slivers 5a, 5b that are withdrawn from spinning cans 4 in the direction of the Arrow (A) are guided via deflecting rollers 13, 14 to the high-draft drafting frames 6. In this case, one sliver guide 15 is connected in front of each of the high-draft drafting frames 6. One yarn guard 16 is in each case disposed in the moving course of the slivers 5a, 5b and actuates a clamp 17 that is arranged in front of the sliver guide 15, if it is determined that the sliver 5a, 5b is absent. In this case, it is provided that the sliver guards 16 of both slivers 5a, 5b, in each case, actuate both sliver clamps 17 even if the absence of only one of the slivers 5a, 5b is determined. Another yarn guard 18 is assigned to the spools 11 and is arranged between the withdrawal rollers 9 and the winding roller 12 and also in the case of the breakage of one component of the double yarn, actuates both sliver clamps 17.

The spools 11 are fed as feed spools 11' in a creel 23 to machine 2 that carries out a twisting of the double yarns 10. As shown in FIGS. 1 and 2, this machine 2, on each side, is provided with a number of operating points (b) that are present in a significantly larger number than the operating points (a) of machine 1, i.e., at least in a number that is twice as high. The double yarns 10 are fed via yarn clamps 33 in each case to a delivery device 25 from which they move via a yarn guide 26 in the direction of the Arrow (D) to a ring spindle 27. The ring spindle 27 is disposed in a spindle bearing plate that is not shown by means of a bearing housing 28. The drive of the ring spindle 27 takes place via a driving wharve 29 around which a driving belt 30 is wound that is driven by an electric motor 31. Between the delivery device 25 and the yarn guide 26, a yarn guard 32 is arranged that responds in the case of a breakage of one yarn component or both yarn components and then actuates the yarn clamp 33. Thus double yarn 10 is thus twisted together into a twisted yarn 43 that is wound onto a twisted-yarn spool 34.

Since the machine 2 for producing the twisted yarn 43 does not have to turn back any spinning twist in the double yarn 10, work can take place at a delivery speed that is at least 30% above the operating speeds that previously have been customary in the case of ring twisting machines. For the same reasons, the $\alpha$-value may also be selected to be about 30% lower.

The finished twisted yarn 43 normally contains thin and thick points. The twisted-yarn spools 34 are therefore fed to a machine segment 3 for rewinding that, in a known way (e.g., compare the commercially available Schlafhorst Autoconer machine), cuts the thick points or the thin points out of the twisted yarn 43 and replaces them by knots or, even better, by spliced connections. On this machine 3, cross-wound spools 39 are produced that contain no more thin or thick points in the twisted yarn 43. The machine 3 for rewinding, in turn, contains significantly fewer operating points than machine 2 because it can work at a significantly higher speed.

The machine segments 1, 2, 3 are combined into a production unit or compound machine system. For this purpose, conveying devices are arranged between the individual machines 1, 2, 3, which conveying devices are operated preferably completely automatically. Embodiments are also contemplated with non-automatic operation of the conveying devices.

Machine segment 1, that produces the feed spools 11 of prestrengthened yarn, is connected with machine segment 2, that carries out the finish twisting, via a conveying device 21 that is developed as a type of conveyor belt, has a longitudinal oval shape and that, in each case, with one strand, extends in parallel to the machines 1, 2 that are arranged behind one another and in parallel to one another (See FIG. 2). The finished prestrengthened yarn feed spools 11 that are produced in the machine segment 1 are ejected and, via a chute 19 (FIG. 1), arrive in a ready position in which the feed spools 11' are taken over by means of an elevator 20 and are delivered to the conveying device 21. The elevator 20 is advantageously, preferably developed as a travelling unit that can be moved back and forth in longitudinal direction of the machine 1 and stops when it grips a feed spool 11', picks up this feed spool 11' and delivers it in upward direction to the conveying device 21.

The conveying device 21 circulates continuously and in the process passes feed spools 11'' through between the two rows of operating points (b) of the machine 2. A travelling unit 22 is assigned to machine 2 and is called by the operating point at which the feed spool 11''' was used up. The travelling unit 22 will then grip a feed spool 11'' from the conveying device 21 and will place it into the creel 23. The subsequently required piecing twisting may be carried out manually. However, it is contemplated in especially preferred embodiments to carry out this piecing twisting by means of a movable servicing device that is integrated into the travelling unit 22 or moves automatically around the machine 2.

Between machine segment 2 and machine segment 3 that is arranged as an extension, two conveying devices 37, 38 are arranged that extend in longitudinal direction of these two machines 2, 3 and that feed the twisted-yarn spools 34' to machine segment 3 for the rewinding. On each side of the machine segment 2, a travelling unit 35, 36 is arranged that can be moved back and forth in longitudinal direction of the machine segment 2 (direction of the Arrows L-M; K-J). These travelling units 35, 36 take the filled twisted-yarn spools 34 of the machine 2 and deposit them on the conveying devices 37, 38 that apply these twisted-yarn spools 34' to machine segment 3. The twisted-yarn spools 34' may, as shown, be conveyed on the conveying devices 37, 38 in a horizontal position. It is also contemplated to provide the conveying device 37, 38 with spikes for the fitting-on of the twisted-yarn spools 34'. Reference is hereby made to commercially available connection systems for connecting a ring spinning machine with a spooling machine, such as the Hollingsworth SPINCOMAT type 803 IMDS and 802 machines.

The twisted-yarn spools 34' are taken off the machine 3 for the rewinding in a known way and are delivered to it in a fully automatic way. The rewound, cross-wound spools 39 containing the cleaned twisted yarn 43 are then delivered to a conveying device 40 on which they are moved away in the direction of the Arrow (R).

The empty twisted-yarn spool tubes are returned in the direction of the Arrows (P and Q) by means of conveying devices 45, 46 arranged between machine segment 3 and machine segment 2 and are delivered to magazines 44. In a similar manner, conveying devices may also be provided between machine segment 2 and machine segment 1 that convey the empty tubes of the feed spools 11 back to machine segment 1 according to preferred embodiments of the invention.

Assigned to machine segment 1 is also a feeding device 42 in the form of a conveyor belt that feeds spinning cans 4' in the direction of the Arrow (S).

In comparison to a conventional ring spinning machine, machine segment 1 operates at a yarn delivery speed that is 12 to 20 times higher. Machine segment 2 for the twisting, as explained before, operates at a speed that is at least 30% above today's standard. Machine segment 3, that corresponds to a conventional machine, in turn, operates faster than machine segment 2. The operating points of machine segments 1, 2, 3, with respect to their number, are coordinated with one another as a function of the production performance of the individual machine segments 1, 2, 3. In this case, it is provided that the number of operating points is set in such a way that the machine segment that follows in the production sequence, in each case, can process a larger quantity than the preceding machine segment so that sufficient safety exists.

Since the feed spools 11 coming from machine segment 1 are larger than the conventional flyer spools, they do not fit on a conventional creel. It is therefore provided that the creel 23, in contrast to the shown embodiment, has several tiers.

The following values are preferably used: The produced feed spools 11 with the double yarn 10 may be produced with a stroke of 6 inches and a diameter of a magnitude of 240 mm. The slivers 5a, 5b are fed from spinning cans 4 or in the form of Finesseur spools or flyer spools. The yarn delivery in the vertical-draft drafting frame 6 amounts to at least 200 m/min. The prestrengthening of the individual slivers 5a, 5b in the twisting zone 7 should not exceed a maximum of 50% of the resistance to breaking of a comparable ring spun yarn.

In machine segment 2, the feed spools 11''' are fed on a creel 23. The spindle division should be in the order of 75 mm, in which case a ring diameter of 50 to 55 mm is provided. The $\alpha$-value of the twisted yarn 43 is at least 30% lower than in the case of classical twisted yarns. In a modified embodiment in which the feed spools are, for example, arranged with horizontal axes, it is necessary under all circumstances to apply a protective twist to the double yarn during its withdrawal from the feed spools 11''', by means of providing it with an additional false twist. In this case, a corresponding false-twisting device may be arranged directly in front of the delivery device 25. The height of the machine to the delivery device 25 is approximately in the order of 1,260 mm so that above it, there is still sufficient space for a creel that may also be operated by hand.

It is also contemplated to wind the prestrengthened yarn components individually on a separate spool which are not guided together before the machine segment 2 for finish-twisting, i.e., the twisting machine segment that is in this case equipped with correspondingly developed withdrawal devices.

The compound machine system shown in FIGS. 1 and 2 may also be retooled for spinning a single yarn while maintaining the construction that is similar in principle. In this case, the three machine segments that are combined into a production unit are a simplified air spinning machine segment 1, a simplified ring spinning machine segment 2 and a wind-up machine segment 3. The air spinning machine segment 1 produces feed spools 11, 11', 11" that consist of an only prespun yarn 10 that is spun finished in the ring spinning machine segment 2 into a completely twisted yarn 43. The cops 34, 34' that were produced in the ring spinning machine segment 2 are subsequently wound up to cross-wound spools by the wind-up machine segment 3, the defects in the yarn having been cleaned out. The following descriptions of such a "single" prestrengthened yarn system repeats in large part the description of similar features for the double yarn construction described above.

The air spinning machine 1 contains several spinning points (a) that process slivers 5 that are withdrawn from spinning cans 4. The slivers 5, in the spinning points (a), by means of vertical-draft drafting frames 6, are drawn to the desired yarn count. The delivery speed of the drafting frame 6 amounts to more than 200 m/min. The vertical-draft drafting frames 6 of the spinning points (a) of the air spinning machine segment 1 are followed by twisting zones 7 in which the slivers 5 that were drawn to the desired yarn count, are prestrengthened by pneumatic false twisting by means of air nozzles. In this manner, ends of fibers are wound around the core of the individual slivers 5 that is essentially untwisted after leaving the air nozzles. During this aid spinning, only a prestrengthening takes place that provides the slivers 5 with such a strength that they withstand the further treatment also at increased speeds. However, it is not carried out so far that the slivers 5, after this prestrengthening or prespinning, would be usable as yarns.

Following the respective twisting zone 7, the spinning points (a) contain a pair 9 of withdrawal rollers that withdraws the prestrengthened yarn 10 and winds it onto a spool 11, particularly a cross-wound spool, that is driven by a winding roller 12.

The slivers 5 that are withdrawn from the spinning cans 4 in the direction of the Arrow A are fed via deflecting rollers 13, 14 to the vertical-draft drafting frames 6. A sliver guide 1 is connected in front of each vertical-draft drafting frame 6. In the path of the slivers 5, one yarn guard 16 respectively is disposed that actuates a sliver clamp 17 that is in each case arranged in front of a sliver guide 15 if the absence of the incoming sliver 5 is noticed. An additional guard 18 is connected behind the withdrawal rollers 9 and determines the presence of the prestrengthened yarn 10. If an absence of the prestrengthened yarn 10 is noticed here, the sliver clamp 17 is also actuated so that no additional sliver 5 enters the vertical-draft drafting frame 6.

The spools 11 of prestrengthened or prespun yarn (10) that are produced by the air spinning machine segment 1, are fed as feed spools 11''', to a creel 23 of the simplified ring spinning machine 2. In each case, one of the spinning points (b) of the ring spinning machine 2 produces a completely twisted yarn 43.

The spinning points (b) of the ring spinning machine 2 each contain a delivery device 25 that withdraws the prestrengthened yarn 10 from the feed spools 11'''. The yarn, in the direction of the Arrow (D), passes through a yarn guide 26 and then through a ring of a ring spindle 27 on which it is wound up to a cop 34. The spindle 27, via a driving wharve 29, is driven by means of a driving belt 30 that, in turn, is driven by an electric motor 31. The spindle 27, by means of a bearing housing 28, is disposed in a spindle bearing plate that is not shown. Between the delivery device 25 and the yarn guide 26, a yarn guard 32 is arranged that responds in the case of a yarn breakage and then actuates a Yarn Clamp 33 that is arranged in front of the delivery device 25. In addition, the yarn guard 32 may also control the electric motor 31 of the respective spinning point (b).

The finished yarn 43 that is wound on the cops 34 usually contains thin and thick points. The cops 34 are therefore fed to a winding machine segment 3 that cuts the thin or thick points out of the yarn 43 and reconnects the remaining yarn ends with one another, particularly by means of spliced connections. The winding machine segment 3 produces cross-wound spools containing no more thin or thick points. A winding machine 3 of this type operates at very high speeds so that considerably fewer spooling points are required than spinning points (b) at the simplified ring spinning machine segment 2.

The air spinning machine segment 1, the ring spinning machine segment 2 and the winding machine segment 3 are combined into a machine system or compound machine. For this purpose, conveying devices are provided that are controlled manually, semi-automatically and fully automatically.

The air spinning machine 1 is connected with the ring spinning machine segment 2 via a continuous, circulating conveying device 21 that is developed as a type of conveyor belt and that takes an oval path, in each case, one end of the belt extending in parallel to the air spinning machine segment 1 and the ring spinning machine 2 that are arranged next to one another. The spools 11 produced in the air spinning machine 1, after they are wound completely, are ejected and via a chute 19, are moved into a ready position 11'. From this ready position 11', they are taken over by an elevator 20 and transferred to the circulating conveying device 21. The elevator 20 is developed as a traveling unit that can be moved back and forth in longitudinal direction of the air spinning machine segment 1, that stops when it grips a feed spool 11' and transfers this feed spool 11' in upward direction to the conveying device 21.

The conveying device 21, that circulates continuously or intermittently, guides the feed spools 11' through between two rows of spinning points (B) of the ring spinning machine segment 2. A travelling unit 22 is assigned to the ring spinning machine 2 and is called by that spinning point (b) where the feed spool 11''' is used up. The travelling unit 22 will then take a feed spool 11" off the conveying device 21 and place it in the creel 23 from which the empty spool tube was removed previously. The subsequent start spinning may be carried out manually. However, it is also contemplated to carry out this start spinning by means of a drivable servicing unit that, for example, is integrated into the travelling unit 22 or that moves around the ring spinning machine segment 2 independently.

Between the ring spinning machine segment 2 and the winding machine segment 3 that is arranged as its extension, two conveying devices 37, 38 are arranged that extend in longitudinal direction of these two machines on which the cops 34' are guided to the winding machine segment 3 for rewinding. On each side of the ring spinning machine segment 2, a travelling unit 35, 36 is arranged that can be moved back and forth in longitudinal direction of the ring spinning machine and that takes the filled cops 34 off the ring spinning machine segment 2 and deposits them on the conveying devices 37 or 38. These conveying devices 37, 38 supply the cops 34' to the winding machine segment 3.

As shown in FIG. 2, the cops 34' may be transported on the conveying devices 37, 38 in horizontal position. It is also contemplated to provide the conveying devices 37, 38 with spikes onto which the cops 34' are then fitted. The cops 34', in a known way, are taken over by the winding machine 3 and are placed completely automatically in the respective winding position. The rewound and cleaned cross-wound spools are then moved away for further processing.

The empty cop tubes are conveyed back by means of conveying devices 45, 46 arranged between the winding machine segment 3 and the ring spinning machine segment 2 and are supplied to magazines 44. In a similar manner, conveying devices, that are not shown, for spool tubes may be provided between the ring spinning machine segment 2 and the air spinning machine segment 1 that convey the empty spool tubes back to the air spinning machine segment 1.

Figure 1A:
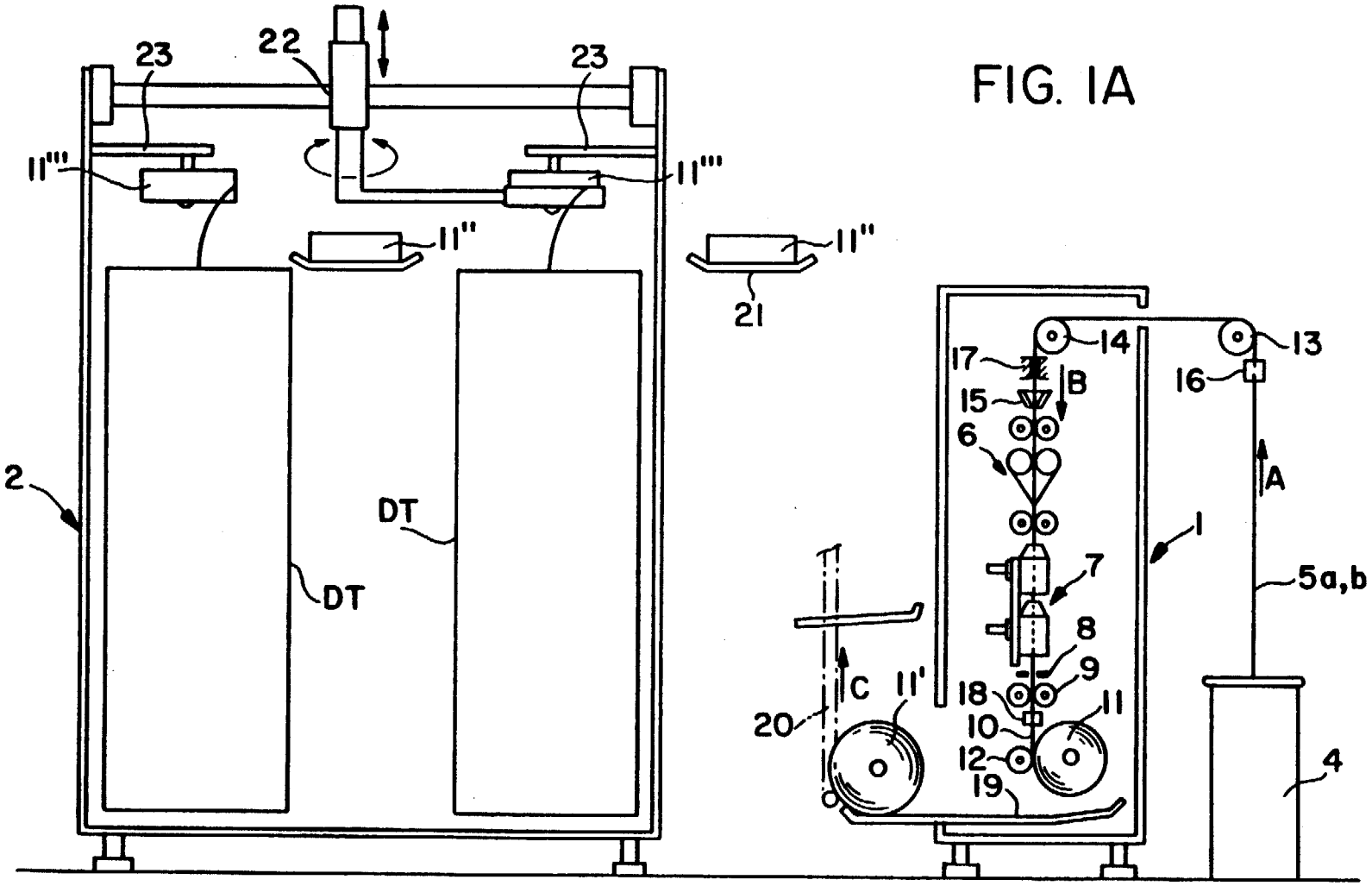
*FIG. 1A schematically shows a second embodiment of a compound machine system with a double-twist frame as the second machine portion; and*

*FIG. 1A schematically depicts a second embodiment which is similar to the embodiment of FIGS. 1 and 2 except that double-twist spinning frame units DT are used in place of the ring spinning units for this subsequent twisting machine segment.*

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A compound machine arrangement for producing a staple fiber yarn that is prespun on an air spinning machine segment, the spinning units of which air spinning machine segment each containing a drafting frame, a pneumatic false-twisting nozzle, a withdrawal device and a wind-up device for winding up a spool with prespun yarn, said prespun yarn being subsequently finish-spun on a finish spinning machine segment having spinning units of which each contains at least one spool receiving device and a ring spindle, wherein the air spinning machine segment and the ring spinning machine segment are connected via a conveying device for spools receiving the prespun yarn to form a compound machine system, wherein the ring spinning machine segment and the air spinning segment each have a different number of spinning units (a,b) that are operatively coordinated with one another to produce the staple fiber yarn.

2. An arrangement according to claim 1, wherein the ring spinning machine segment has at least twice the number of spinning units (b) as does the machine for producing the feed spools.

3. An arrangement according to claim 1, wherein the machine segments are arranged in parallel to one another, and wherein a joint conveying device for the feed spools is provided that moves along both machine segments.

4. An arrangement according to claim 1, wherein the ring spinning machine segment has a number of spinning units (b) on each of opposite sides of the ring spinning machine segment.

5. An arrangement according to claim 4, wherein the conveying device extends in the center between rows of spinning units (b) of the ring spinning machine segment.

6. An arrangement according to claim 1, wherein the conveying device is designed as a continuously or step-by-step circulating intermediate storage device that intermediately stores the feed spools behind the air spinning machine segments which produces the feed spools.

7. An arrangement according to claim 1, wherein feed spool transfer devices are provided for automatically transferring feed spools from the air spinning machine segment to the conveying device.

8. An arrangement according to claim 7, wherein the feed spool transfer devices are developed as a travelling unit that can be moved along the air spinning machine segment.

9. An arrangement according to claim 1, wherein spool removal devices are provided for the automatic removal of the feed spools from the conveying device and for the automatic transfer to the ring spinning machine segment for finish-spinning.

10. An arrangement according to claim 9, wherein the spool removal devices are developed as one or several travelling units that can be moved along the ring spinning machine segment.

11. An arrangement according to claim 1, further comprising a rewinding machine segment for the rewinding of the staples fiber yarn, and a finish yarn conveying device for ring spun yarn spools, said rewinding machine segment being connected with the ring spinning machine segment via the finish yarn conveying device for the ring spun yarn spools to form an integral production unit together with the air spinning and ring spinning units.

12. An arrangement according to claim 11, wherein finish yarn transfer devices are provided for the automatic transfer of the ring spun yarn spools to the finish yarn conveying device.

13. An arrangement according to claim 12, wherein the finish yarn transfer devices are developed as travelling units that can be moved along the ring spinning machine segment.

14. An arrangement according to claim 11, wherein devices are provided for the automatic removal of the ring spun yarn spools and for the automatic transfer to the rewinding machine segment for the rewinding.

15. An arrangement according to claim 11, wherein a device is provided for returning empty tubes from the rewinding machine segment to the ring spinning machine segment for the finish-spinning.

16. An arrangement according to one of claim 1, wherein a device is provided for returning empty spool tubes from the ring spinning machine segment for finish-spinning to the air spinning machine segment for producing the feed spools.

17. An arrangement according to claim 1, wherein a simplified air spinning machine with a can creel is provided as the air spinning machine segment.

*18. A compound machine arrangement for producing a staple fiber yarn that is prespun on an air spinning machine segment, the spinning units of which air spinning machine segment each containing a drafting frame, a pneumatic false-twisting nozzle, a withdrawal device and a wind-up device for winding up a spool with prespun yarn, said prespun yarn being subsequently twisted on a subsequent twist-*

*ing machine segment having units which each contains at least one spool receiving device and a spindle, wherein the air spinning machine segment and the subsequent twisting machine segment are connected via a conveying device for spools receiving the prespun yarn to form a compound machine system, wherein the subsequent twisting machine segment and the air spinning segment each have a different number of units (a,b) that are operatively coordinated with one another to produce the staple fiber yarn.*

*19. An arrangement according to claim 18, wherein the subsequent twisting machine segment has at least twice the number of units (b) as does the machine for producing the feed spools.*

*20. An arrangement according to claim 19, wherein said air spinning units each include means for producing a pair of prespun yarn components which are wound up side-by-side as double yarn on the spool with prespun yarn.*

*21. An arrangement according to claim 20, wherein the units of the subsequent twisting machine segments include double twist frame units for twisting the double yarn.*

*22. An arrangement according to claim 18, wherein the machine segments are arranged in parallel to one another, and wherein a joint conveying device for the feed spools is provided that moves along both machine segments.*

*23. An arrangement according to claim 18, wherein the subsequent twisting machine segment has a number of units (b) on each of opposite sides of the subsequent twisting machine segment.*

*24. An arrangement according to claim 23, wherein the conveying device extends in the center between rows of units (b) of the subsequent twisting machine segment.*

*25. An arrangement according to claim 18, wherein the conveying device is designed as a continuously or step-by-step circulating intermediate storage device that intermediately stores the feed spools behind the air spinning machine segments which produces the feed spools.*

*26. An arrangement according to claim 18, wherein feed spool transfer devices are provided for automatically transferring feed spools from the air spinning machine segment to the conveying device.*

*27. An arrangement according to claim 26, wherein the feed spool transfer devices are developed as a travelling unit that can be moved along the air spinning machine segment.*

*28. An arrangement according to claim 18, wherein spool removal devices are provided for the automatic removal of the feed spools from the conveying device and for the automatic transfer to the subsequent twisting machine segment for subsequent twisting.*

*29. An arrangement according to claim 28, wherein the spool removal devices are developed as one or several travelling units that can be moved along the subsequent twisting machine segment.*

*30. An arrangement according to claim 18, further comprising a rewinding machine segment for the rewinding of the subsequently twisted yarn, and a finish yarn conveying device for subsequently twisted yarn spools, said rewinding machine segment being connected with the subsequent twisting machine segment via the finish yarn conveying device for the subsequently twisted yarn spools to form an integral production unit together with the air spinning and subsequent twisting units.*

*31. An arrangement according to claim 30, wherein finish yarn transfer devices are provided for the automatic transfer of the subsequently twisted yarn spools to the finish yarn conveying device.*

*32. An arrangement according to claim 31, wherein the finish yarn transfer devices are developed as travelling units that can be moved along the subsequent twisting machine segment.*

*33. An arrangement according to claim 30, wherein devices are provided for the automatic removal of the subsequently twisted yarn spools and for the automatic transfer to the rewinding machine segment for the rewinding.*

*34. An arrangement according to claim 30, wherein a device is provided for returning empty tubes from the rewinding machine segment to the subsequent twisting machine segment for the subsequent twisting.*

*35. An arrangement according to claim 18, wherein a device is provided for returning empty spool tubes from the subsequent twisting machine segment to the air spinning machine segment for producing the feed spools.*

*36. An arrangement according to claim 18, wherein a simplified air spinning machine with a can creel is provided as the air spinning machine segment.*

*37. An arrangement according to claim 18, wherein said air spinning units each include means for producing a pair of prespun yarn components which are wound up side-by-side as double yarn on the spool with prespun yarn.*

*38. An arrangement according to claim 37, wherein the units of the subsequent twisting machine segments include double twist frame units for twisting the double yarn.*

*39. An arrangement according to claim 38, wherein feed spool transfer devices are provided for automatically transferring feed spools from the air spinning machine segment to the conveying device.*

*40. An arrangement according to claim 18, wherein feed spool transfer devices are provided for automatically transferring feed spools from the air spinning machine segment to the conveying device.*

*41. A compound machine arrangement for producing a staple fiber yarn that is prespun on a first spinning machine segment, the spinning units of which first spinning machine segment each containing first twisting means, a withdrawal device and a wind-up device for winding up a feed spool package with prespun yarn, said prespun yarn being subsequently twisted on a subsequent twisting machine segment having units which each contain at least one feed spool package receiving device and a spindle, wherein the first spinning machine segment and the subsequent twisting machine segment are connected via a conveying device for the feed spool packages to form a compound machine system, wherein the subsequent twisting machine segment and the first spinning machine segment each have a different number of units (a,b) that are operatively coordinated with one another to produce the staple fiber yarn, and*

*wherein the subsequent twisting machine segment has at least twice the number of units (b) as does the first twisting machine segment for producing the feed spool packages.*

*42. An arrangement according to claim 41, wherein the machine segments are arranged in parallel to one another, and wherein a joint conveying device for the feed spool packages is provided that moves along both machine segments.*

*43. An arrangement according to claim 41, wherein the subsequent twisting machine segment has a number of units (b) on each of opposite sides of the subsequent twisting machine segment.*

*44. An arrangement according to claim 41, wherein the first spinning machine segment is an air spinning machine segment which produces the feed spool packages, wherein the conveying device is designed as a continuously or step-by-step circulating intermediate storage device that intermediately stores the feed spool packages behind the air*

*spinning machine segment which produces the feed spool packages.*

*45. An arrangement according to claim 41, wherein feed spool package transfer devices are provided for automatically transferring feed spool packages from the first spinning machine segment to the conveying device.*

*46. An arrangement according to claim 45, wherein the feed spool package transfer devices are developed as a travelling unit that can be moved along the first spinning machine segment.*

*47. An arrangement according to claim 41, wherein feed spool package removal devices are provided for the automatic removal of the feed spool packages from the conveying device and for the automatic transfer to the subsequent twisting machine segment for subsequent twisting.*

*48. An arrangement according to claim 47, wherein the feed spool package removal devices are developed as one or several travelling units that can be moved along the subsequent twisting machine segment.*

*49. An arrangement according to claim 41, wherein a device is provided for returning empty spool tubes from the subsequent twisting machine segment to the first spinning machine segment for producing the feed spool packages.*

*50. An arrangement according to claim 41, wherein said spinning units of the first spinning machine segment each include means for producing a pair of prespun yarn components which are wound up side-by-side as double yarn on the feed spool packages with prespun yarn.*

*51. An arrangement according to claim 50, wherein the units of the subsequent twisting machine segment include double twist frame units for twisting the double yarn.*

*52. An arrangement according to claim 41, wherein feed spool package transfer devices are provided for automatically transferring feed spool packages from the first spinning machine segment to the conveying device.*

*53. A compound machine arrangement for producing a staple fiber yarn that is prespun on a first spinning machine segment, the spinning units of which first spinning machine segment each containing first twisting means, a withdrawal device and a wind-up device for winding up a feed spool package with prespun yarn, said prespun yarn being subsequently twisted on a subsequent twisting machine segment having units which each contain at least one feed spool package receiving device and a spindle, wherein the first spinning machine segment and the subsequent twisting machine segment are connected via a conveying device for the feed spool packages to form a compound machine system, wherein the subsequent twisting machine segment and the first spinning machine segment each have a different number of units (a,b) that are operatively coordinated with one another to produce the staple fiber yarn,*

*wherein the subsequent twisting machine segment has a number of units (b) on each of opposite sides of the subsequent twisting machine segment, and*

*wherein the conveying device extends in the center between rows of units (b) of the subsequent twisting machine segment.*

*54. A compound machine arrangement for producing a staple fiber yarn that is prespun on a first spinning machine segment, the spinning units of which first spinning machine segment each containing first twisting means, a withdrawal device and a wind-up device for winding up a feed spool package with prespun yarn, said prespun yarn being subsequently twisted on a subsequent twisting machine segment having units which each contain at least one feed spool package receiving device and a spindle, wherein the first spinning machine segment and the subsequent twisting machine segment are connected via a conveying device for the feed spool packages to form a compound machine system, wherein the subsequent twisting machine segment and the first spinning machine segment each have a different number of units (a,b) that are operatively coordinated with one another to produce the staple fiber yarn,*

*further comprising a rewinding machine segment for the rewinding of the subsequently twisted yarn, and a finish yarn conveying device for subsequently twisted yarn spools, said rewinding machine segment being connected with the subsequent twisting machine segment via the finish yarn conveying device for the subsequently twisted yarn spools to form an integral production unit together with the first spinning machine segment and subsequent twisting machine segment.*

*55. An arrangement according to claim 54, wherein finish yarn transfer devices are provided for the automatic transfer of the subsequently twisted yarn spools to the finish yarn conveying device.*

*56. An arrangement according to claim 55, wherein the finish yarn transfer devices are developed as travelling units that can be moved along the subsequent twisting machine segment.*

*57. An arrangement according to claim 54, wherein devices are provided for the automatic removal of the subsequently twisted yarn spools and for the automatic transfer to the rewinding machine segment for the rewinding.*

*58. An arrangement according to claim 54, wherein a device is provided for returning empty tubes from the rewinding machine segment to the subsequent twisting machine segment for the subsequent twisting.*

*59. A compound machine arrangement for producing a staple fiber yarn that is prespun on a first spinning machine segment, the spinning units of which first spinning machine segment each containing first twisting means, a withdrawal device and a wind-up device for winding up a feed spool package with prespun yarn, said prespun yarn being subsequently twisted on a subsequent twisting machine segment having units which each contain at least one feed spool package receiving device and a spindle, wherein the first spinning machine segment and the subsequent twisting machine segment are connected via a conveying device for the feed spool packages to form a compound machine system, wherein the subsequent twisting machine segment and the first spinning machine segment each have a different number of units (a,b) that are operatively coordinated with one another to produce the staple fiber yarn, and*

*wherein said spinning units of the first spinning machine segment each include means for producing a pair of prespun yarn components which are wound up side-by-side as double yarn on the feed spool package with prespun yarn.*

*60. An arrangement according to claim 59, wherein the units of the subsequent twisting machine segment include double twist frame units for twisting the double yarn.*

*61. An arrangement according to claim 60, wherein feed spool transfer devices are provided for automatically transferring feed spool packages from the first spinning machine segment to the conveying device.*

* * * * *